Jan. 26, 1960   D. F. DROW   2,922,617
VALVE
Filed March 26, 1957

INVENTOR.
Donald F. Drow
BY
His Attorney

United States Patent Office 2,922,617
Patented Jan. 26, 1960

2,922,617

VALVE

Donald F. Drow, Los Angeles, Calif., assignor to The Deutsch Company, a corporation of California Application March 26, 1957, Serial No. 648,602

3 Claims. (Cl. 251—184)

The invention relates to values of the rotary plug cock type as commonly used to provide manually controlled shut-off valves in the fuel line of gas burning appliances, and as more particularly disclosed in Patent No. 2,785,874.

The present invention carries forward the general objective accomplished in the aforesaid patent of the provision in a valve of the character described of a spring take-up on the conical valve plug or rotor so as to constantly maintain a satisfactory pressure upon the sealing surfaces of the valve and valve chamber to provide a good seal and at the same time providing means for positively preventing accidental axial displacement of the rotor in the chamber as would cause a disengagement of the rotor from the valve chamber wall and a cracking of the valve and attendant leakage of gas.

A more specific object of the present invention is to provide a valve of the character above wherein the aforementioned features are accomplished in a valve structure which may be more easily and readily adjusted to and set at a precise bearing pressure of the rotary valve on its chamber seat and which may also be more easily and readily readjusted and reset as wear on the sliding parts may take place.

A further object of the present invention is to provide a valve of the character described which is composed of a minimum number of simply and sturdily formed parts designed for relatively low cost, mass production and assembly, and which will afford the valve a long and trouble-free life.

The invention possesses other objects and features of advantage, some of which, with the foregoing, will be set forth in the following description of the preferred form of the invention and which is illustrated in the drawing accompanying and forming part of the specification. It is to be understood, however, that variations in the showing made by the said drawing and description may be adopted within the scope of the invention as set forth in the claims.

Referring to said drawings (one sheet):

Figure 1:
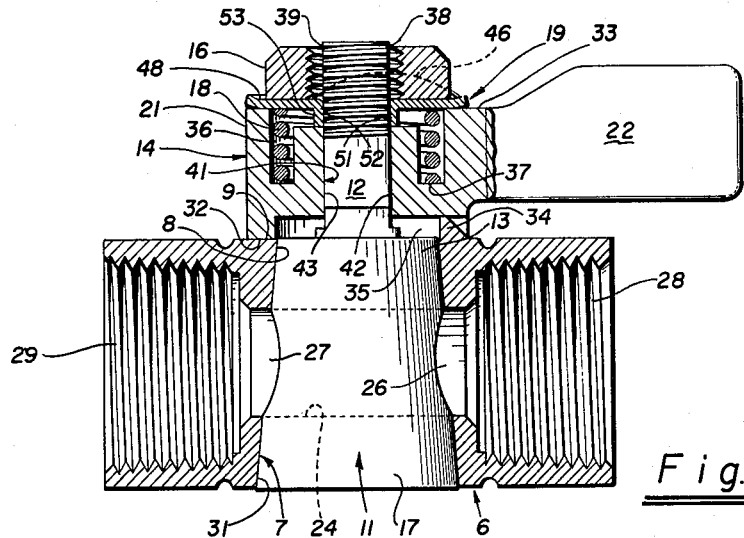
Figure 1 is a longitudinal sectional view on an enlarged scale of a valve constructed in accordance with the present invention.

The valve of the present invention and as illustrated in the accompanying drawing consists, briefly, of a valve body 6 having a conical valve chamber 7 opening at its smaller diameter end 8 to a side 9 of the body, a valve rotor 11 mounted in the chamber and having a stem 12 extending axially from the small diameter end 13 of the rotor and from the body side 9, a handle 14 mounted on the stem 12 and bearing on the body side 9 and being keyed to the stem 12 for joint rotation and relative axial reciprocation, a nut 16 threaded onto the stem and against the handle 14 to provide a solid connection between the stem 12 and handle 14 and body 6, locking the rotor 11 against axial displacement in the direction of its larger diameter end 17, resilient means 18 connected between the handle 14 and nut 16 and constantly urging the handle against the body side 9 and the rotor axially in the direction of its smaller diameter end 13, and means 19 locking the nut 16 against rotation on the stem, thereby preserving the integrity and preciseness of the adjustment of the several parts during use.

Figure 2:
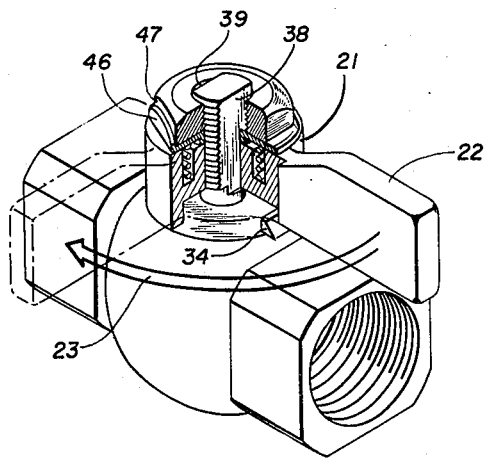
Figure 2 is a perspective view of the valve partially cut away to show interior structure.

The handle 14 is here formed with a generally cylindrical section 21 and a radially extending arm or handle portion 22 which may be manually engaged and swung about the central axis of the hub 21 as depicted in dotted lines and by arrow 23 in Figure 2, so as to cause a rotary displacement of valve 11 in the valve chamber 7 and control the alignment and registration of a diametrically extending passage 24, with valve ports 26 and 27 formed in the chamber wall in communication with inlet and discharge chambers 28 and 29 afforded by the valve body. As will be seen from Figure 1, the valve rotor 11 is inserted into the chamber 7 through the larger diameter end 31 of the chamber so that the larger diameter end 17 of the rotor will be positioned adjacent the larger diameter end of the chamber, and the smaller diameter end 13 of the rotor will be positioned adjacent the smaller diameter end 8 of the chamber, the action of resilient means 18 being to draw the conical periphery of the rotor against the internesting and interfitted conical interior wall of the valve chamber 7. In this construction the handle section 21 is provided with a flat under side 32 which bears on the flat body side 9, both being perpendicular to the axis of rotation of the valve, and is provided with an opposite outer flat side 33 providing a supporting bearing for the nut 16. A raised lug 34 on the body surface 9 is here positioned in a recess 35 formed in the under side 32 of the handle hub 21, and is engageable with the opposite ends of the recess to determine the terminal rotative positions of the handle.

As a feature of the present construction, the handle section 14 is formed with a concentric annular chamber 36 which opens to the upper side 33 of the section and which functions to house a helical spring which constitutes the resilient means 18 aforementioned, the spring being axially compressed between the bottom 37 of the chamber and the nut 16 so as to constantly urge the handle against the body side and the rotor into its sealed internested position as aforesaid.

The keyed connection of the handle 14 to the stem 12 is here conveniently effected by forming the stem 12 with a pair of diametrically opposed longitudinally extending flats 38 and 39 and forming the hub section 21 of the handle with an interior bore 41 dimensioned for slidably receiving the stem 12 and with diametrically opposed flats 42 and 43 dimensioned for face-to-face contact with the stem flats 38—39 for preventing relative rotation between the handle and stem while permitting relative axial displacement. In this manner the handle 14 may be held firmly against side 9 of the body while the rotor is constantly and resiliently urged in the direction of its smaller diameter end by spring 18. Thus with the nut 16 run down on the stem to provide a solid metal-to-metal contact and support between the stem and the handle and the body, and while the spring 18 is effective to constantly urge the rotor 11 to its seated position, no accidental striking or movement of a body against the handle or other exposed part of the valve can cause relative displacement of the rotor in an unseating direction.

The means 19 here used for locking the nut 16 against rotation on the stem 12 consists of a washer interposed between the nut and handle and keyed to the stem for joint rotation therewith and having a deformable peripheral flange 46 which may be turned up into engagement with one of the flat peripheral sides 47 of the nut after the nut has been rotated to its adjusted position, so as to thereafter prevent relative rotation of the nut on the stem. For this purpose a standard "hex" nut is used, having six polygonal sides, and the washer is formed with a dish-shaped periphery 48, as best seen in Figure 1, for diametric engagement by pliers or the like for crimping up against diametrically opposed sides of the nut to provide the locking flanges 46, as above described. The center opening in the washer is here stamped or pressed out in rectangular form, having opposed sides 51 and 52 engageable with the stem flats 38 and 39 to lock the washer on the stem against rotation, the center opening in the washer and sides 51—52 being peripherally defined and provided by a depending skirt or flange 53 which strengthens and reinforces the center section of the washer and its interlocked connection to the stem. Preferably the washer 19 is somewhat larger in diameter than the nut 16 so as to completely surround the nut and in this manner afford a locking up of the assembly in an infinite number of adjusted positions of the nut, since any diametrically opposed portions of the washer may be flanged up into engagement with any diametrically opposed pairs of sides of the nut. Accordingly when the parts are assembled and as illustrated in Figure 1, the nut 16 is run down approximately finger-tight on the washer 19 to obtain a desired tightness of the assembly, following which the washer is crimped up as above described to lock the assembly in adjusted position. Should further tightening of the nut be desired in the future to take up for wear, it is necessary for the user only to bend back the washer flanges 46 to permit rotation of the nut to a new adjusted position, following which other peripheral portions of the washer may be flanged up against opposed sides of the nut in the manner above described to re-lock the assembly.

Spring 18 may be deleted where so required by local codes. In such case a conventional nonresilient take-up type of rotary plug cock is provided.

I claim:

1. A valve comprising, a valve body having a conical valve chamber opening at its smaller diameter end to a side of said body, a conical valve rotor mounted in said chamber and having a threaded stem extending axially from the smaller diameter end of said rotor and from said body side, a handle mounted on said stem and having a first side bearing on said body side and being keyed to said stem for joint rotation while permitting relative axial reciprocation, said handle being formed with a concentric annular chamber opening to a second side opposite to said first side, the outer end portion of said stem extending from said second handle side, a washer mounted on said outer end portion of said stem and keyed thereto for joint rotation and relative axial reciprocation and bearing on said second handle side, a nut threaded on said outer end portion of said stem and into adjusted position against said washer to provide a solid connection between said stem and body locking said rotor against axial displacement in the direction of its larger diameter end, and a helical spring mounted in said last named chamber and compressed between said handle and said washer for constantly urging said handle against said body side and to constantly urge said rotor axially in the direction of its smaller diameter end, said nut having a flat peripheral side, said washer having a deformable periphery flanged against said nut side in the adjusted position of said nut for locking said nut against rotation on said stem.

2. A valve comprising, a valve body having a conical valve chamber opening at its smaller diameter end to a side of said body, a conical valve rotor mounted in said chamber and having an externally threaded stem extending axially from the smaller diameter end of said rotor and from said body side, a handle mounted on said stem and having a first side bearing on said body side and being keyed to said stem for joint rotation while permitting relative axial reciprocation, said stem extending through said handle and from an opposite outer side thereof, said handle being formed with an annular chamber opening to said outer side, a washer mounted on said stem and keyed thereto for joint rotation and relative axial reciprocation and bearing on said outer handle side, a nut threaded on said stem and into adjusted position against said washer to provide a solid connection between said stem and body locking said rotor against axial displacement in the direction of its larger diameter end, and a helical spring mounted in said annular chamber and compressed between said handle and washer for constantly urging said handle against said body side and to constantly urge said rotor axially in the direction of its smaller diameter end, said nut being formed with flat polygonal sides, said washer being formed with a dish-shaped periphery adapted for crimping up against diametrically opposite sides of said nut for locking said nut against rotation on said stem.

3. A valve comprising a valve body having a conical valve chamber opening at its smaller diameter end to a side of said body, a conical valve rotor mounted in said chamber and having a stem extending axially from the smaller diameter end of said rotor and from said body side, a handle mounted on said stem and having one side bearing on said body side and being keyed to said stem for joint rotation and relative axial reciprocation, the outer end portion of said stem extending from the opposite side of said handle, a washer keyed to said stem for joint rotation and relative axial reciprocation and being engaged against the opposite side of said handle, a nut threaded on said outer end portion of said stem and into adjusted position bearing upon said washer to provide a solid connection between said stem and handle and body locking said rotor against axial displacement in the direction of its larger diameter end, resilient means connected between said handle and nut and constantly urging said handle against said body side and said rotor axially in the direction of its smaller diameter end, said nut having a flat peripheral side, and said washer having a deformable peripheral flange engageable with said nut side for locking said nut in adjusted position against rotation on said stem.

References Cited in the file of this patent

UNITED STATES PATENTS

| 1,222,171 | Wray | Apr. 10, 1917 |
| 1,311,727 | Thomas | July 29, 1919 |
| 1,684,745 | Roberts | Sept. 18, 1928 |
| 1,707,931 | Gibbons | Apr. 2, 1929 |
| 1,894,903 | Dawson | Jan. 17, 1933 |
| 2,056,042 | Fausek | Sept. 29, 1936 |
| 2,785,874 | Drow | Mar. 19, 1957 |

FOREIGN PATENTS

| 20,292 | Great Britain | Sept. 12, 1906 |
| 372,220 | France | Feb. 14, 1907 |